(12) United States Patent
Kwong et al.

(10) Patent No.: US 7,849,301 B2
(45) Date of Patent: Dec. 7, 2010

(54) PROVIDING A USER INPUT INTERFACE PRIOR TO INITIATION OF AN OPERATING SYSTEM

(75) Inventors: Wah Yiu Kwong, Beaverton, OR (US); Wayne L. Proefrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1964 days.

(21) Appl. No.: 10/020,701

(22) Filed: Dec. 12, 2001

(65) Prior Publication Data

US 2003/0107600 A1 Jun. 12, 2003

(51) Int. Cl.
*G09G 5/00* (2006.01)

(52) U.S. Cl. .................. 713/2; 713/168; 713/182; 713/183; 713/192; 713/375; 715/764; 726/16; 726/17; 726/19; 726/28; 710/305

(58) Field of Classification Search .................. 713/200; 715/764, 965–970; 345/173
See application file for complete search history.

(56) References Cited

U.S. PATENT DOCUMENTS

| | | | | |
|---|---|---|---|---|
| 4,570,217 A | * | 2/1986 | Allen et al. ................... 700/83 |
| 4,757,533 A | * | 7/1988 | Allen et al. ................... 713/192 |
| 5,327,497 A | * | 7/1994 | Mooney et al. ............... 235/382 |
| 5,379,057 A | * | 1/1995 | Clough et al. ................. 345/173 |
| 5,448,045 A | * | 9/1995 | Clark .............................. 235/382 |
| 5,594,471 A | * | 1/1997 | Deeran et al. ................. 345/173 |
| 5,675,362 A | | 10/1997 | Claugh et al. |
| 5,692,199 A | * | 11/1997 | Kikinis et al. ................. 710/260 |
| 6,005,767 A | * | 12/1999 | Ku et al. ......................... 361/681 |
| 6,154,836 A | * | 11/2000 | Dawson et al. ................. 713/1 |
| 6,250,548 B1 | * | 6/2001 | McClure et al. ............... 235/51 |
| 6,292,692 B1 | * | 9/2001 | Skelton et al. .................. 607/5 |
| 6,415,023 B2 | * | 7/2002 | Iggulden ................... 379/102.03 |
| 6,525,716 B1 | * | 2/2003 | Makino ........................ 345/173 |
| 7,111,321 B1 | * | 9/2006 | Watts et al. ..................... 726/2 |
| 2002/0073306 A1 | * | 6/2002 | Aluzzo et al. .................. 713/1 |
| 2002/0174353 A1 | * | 11/2002 | Lee ............................. 713/193 |
| 2003/0078709 A1 | * | 4/2003 | Yester et al. ................... 701/36 |
| 2008/0055256 A1 | | 3/2008 | Kwong |

FOREIGN PATENT DOCUMENTS

| | | |
|---|---|---|
| EP | 1 001 331 | 5/2000 |
| WO | WO 93/17388 | 9/1993 |
| WO | WO 00/16193 | 3/2000 |
| WO | WO 01/77792 | 10/2001 |

OTHER PUBLICATIONS

Ultimaco Safeware AG, 'SafeGuard Easy', Ultimaco Safeware AG, Aug. 2000, entire document, http://web.archive.org/web/20000301132302/www.utimaco.de/english/index1.htm.*

Apple Computer, Inc., 'Newton MessagePad 110' [product spec sheet], 1994 Apple Computer, Inc., entire document, http://www.svas.com/computers/mp110.pdf.*

* cited by examiner

*Primary Examiner*—Christian LaForgia
*Assistant Examiner*—Ronald Baum
(74) *Attorney, Agent, or Firm*—Trop, Pruner & Hu, P.C.

(57) ABSTRACT

A processor-based system, including systems without keyboards, may receive user inputs prior to booting. This may done using the graphics controller to generate a window which allows the user to input information. The system firmware may then compare any user inputs, such as passwords, and may determine whether or not to actually initiate system booting.

18 Claims, 3 Drawing Sheets

PROVIDING A USER INPUT INTERFACE PRIOR TO INITIATION OF AN OPERATING SYSTEM

BACKGROUND

This invention relates generally to processor-based systems and particularly to techniques for providing user inputs in those systems.

A number of processor-based systems, such as web tablets, include no keyboard. For example, many devices use a touch screen, a mouse, or pen as the input device, avoiding the need for a keyboard that takes up more space. However each of these input devices generally needs an operating system in order to receive user inputs.

In some cases, the inability to provide inputs prior to booting of the operating system may create a problem. For example, it may be desirable to require the user to enter a password before actually booting the operating system. Once the operating system is booted, the user may be more able to hack the system in order to gain access without a password. Thus it may be advantageous to require entry of a password or other identifier before booting the system.

As another example, it may be desirable for the user to provide certain information to the system, such as hardware settings, prior to actually booting the system. In other words it may be desirable to enable the input of setting information without requiring that the operating system be booted. Examples of machine setup information may be to convert the system from a universal serial bus (USB) to a PS-2 system, to provide different graphics, or to provide a different hard drive.

Of course in systems without a keyboard, there is no way to provide information prior to the time the operating system has booted. Before operating system boot or in the pre-boot phase, the input devices are incapacitated since they require a functioning operating system.

Therefore, there is a need for a way to receive inputs in processor-based systems in the pre-boot phase.

DETAILED DESCRIPTION

Figure 1:
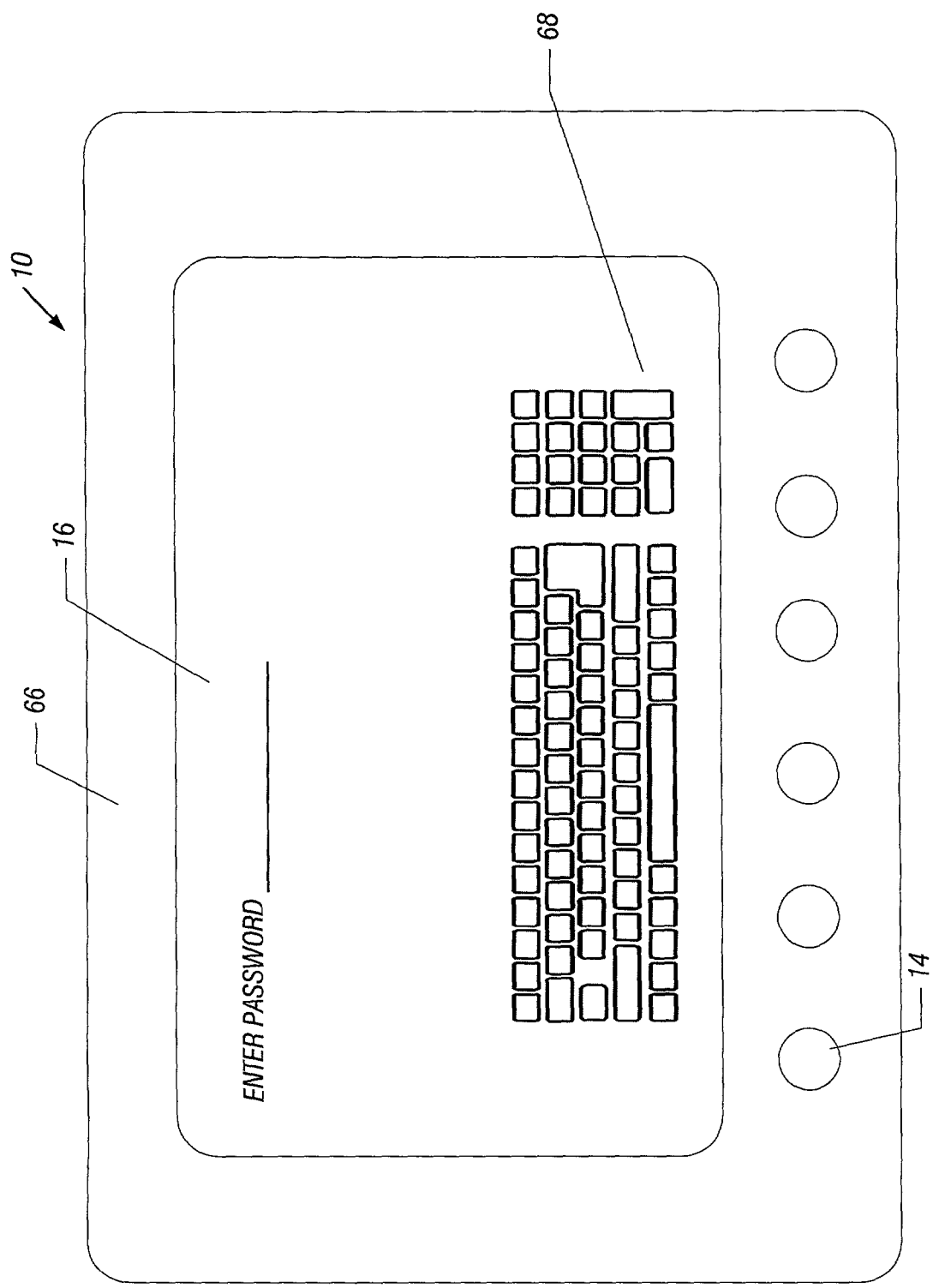
FIG. 1 is a front plan view of one embodiment of the present invention.

Referring to FIG. 1, a processor-based system 10 may include a housing 66 and a display 16. In one embodiment, the display 16 may be a liquid crystal display and the processor-based system 10 may be battery powered. The system 10 may include no keyboard. Instead, the system 10 may use input devices such as a touch screen, a pen, or a mouse. Textual inputs may be entered prior to booting an operating system using an on-screen keyboard image included in a graphical user interface 68.

Examples of systems 10 include personal digital assistants, appliances such as cameras, and web tablets. These devices may be more portable and relatively lower in weight by eliminating the keyboard.

Referring to FIG. 1, when the user operates a start button 14, the graphical user interface 68 appears including a prompt to enter a password and an on-screen keyboard. This may be done before the operating system has been booted. Instead, the interface 68 may be retrieved from storage and displayed by opening a window.

When the user enters an appropriate password, as determined by boot code running in a graphics controller, booting of the operating system may be initiated in one embodiment. In other embodiments, entry of machine settings or other identifiers may be provided in the pre-boot stage.

Figure 2:
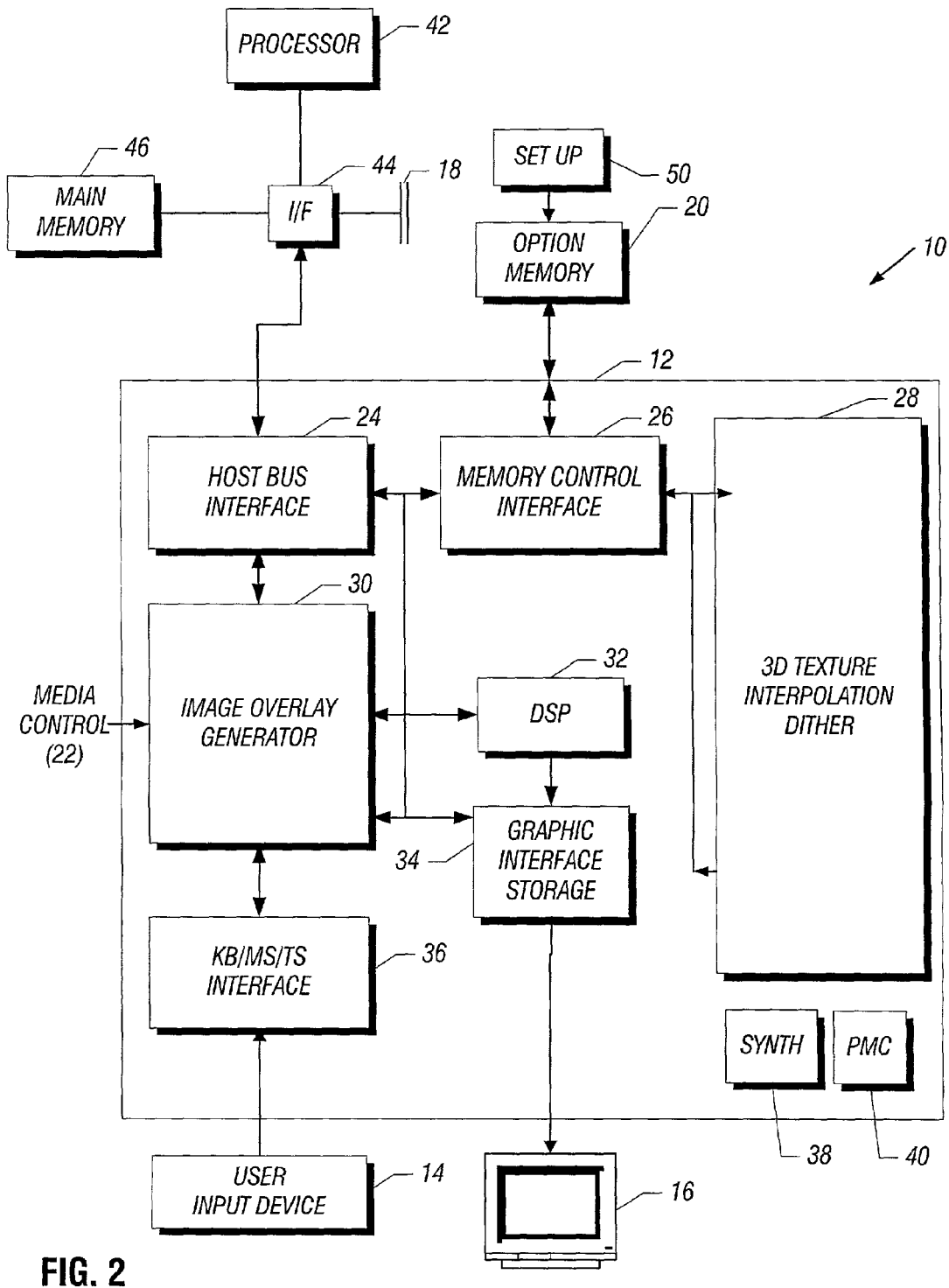
FIG. 2 is a block depiction of the embodiment shown in FIG. 1 in accordance with one embodiment of the present invention.

Turning to FIG. 2, the system 10 may include a processor 42 coupled through an interface 44 to a graphics controller 22. The main memory 46 may be coupled to the interface 44 as may be a bus 18. The graphics controller 42 may receive inputs from a user input device 14 such as a mouse, a pen, or a touch screen display. Media control inputs 22 may be received by an image overlay generator 30. The image overlay generator 30 actually generates the interface 68. An interface 36 provides an interface between the generator 30 and the user interface 14.

A host bus interface 24 may be coupled through the interface 44 to the processor 42 and the main memory 46. A memory control interface 26 may couple the interface 24 to an option memory 20 such as an option read only memory (ROM). In addition, a digital signal processor (DSP) 32 and a graphic image storage 34 may be provided. The graphic image storage 34 stores an image that may be provided from the option memory 20 to generate the interface 68 and eventually displays the interface 68 on a display 16. Thus the graphic interface storage 34 may be a frame buffer or other memory that is capable of storing an image for display on the display 16. A 3-D graphics coprocessor 28 may be utilized for 3-D interpolation applications. A clock synthesizer 38 and a power management controller 40 may be provided as well.

The set up software 50 may be stored in the option memory 20, in one embodiment, for actually initiating the generation of an interface 68 during the pre-boot stage. Thus, the set up software 50 may be run from the graphics controller loaded with code from an option memory or any other software operable during the pre-boot stage.

Figure 3:
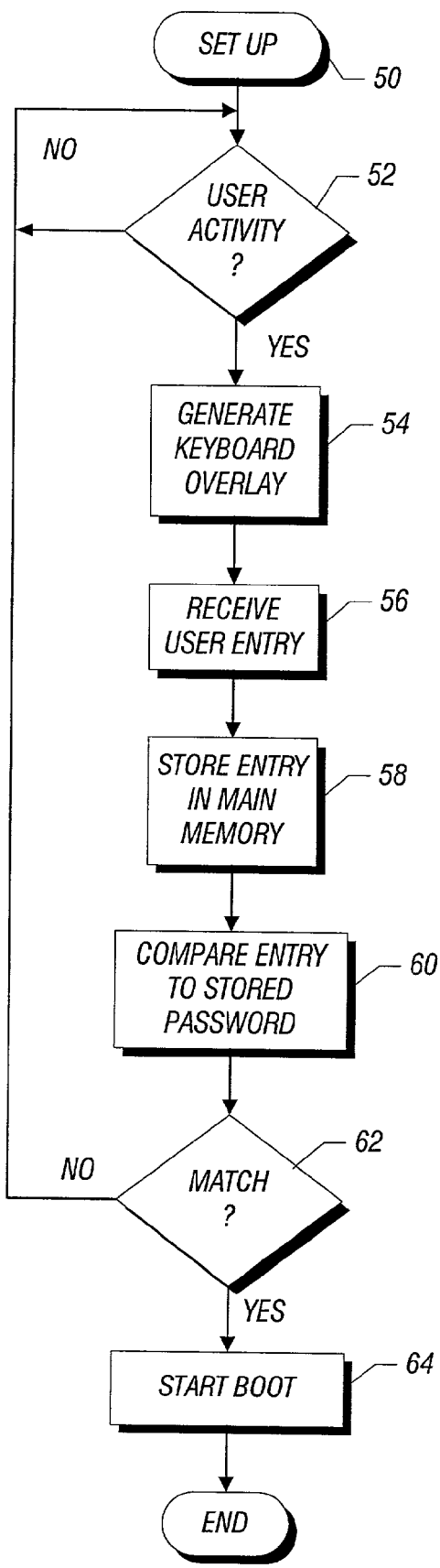
FIG. 3 is a flow chart for software in accordance with one embodiment of the present invention.

Referring to FIG. 3, when user activity is detected, as indicated in block 52, the interface 68 is generated as indicated in block 54. The user activity may be operation of the button 14 indicating that the user wishes to initiate the system. Once the interface 68 is generated, the user inputs, such as a password, may be received through the interface 68 as indicated in block 56. The password entry may be part of the boot code stored in an option memory 20 as indicated in block 58. The entry may then be compared to a stored password necessary to gain access to the system 10 as indicated in block 60. If the graphics controller boot code determines that there is a password match in diamond 62, the boot operation may be started as indicated in block 64 in accordance with one embodiment of the present invention.

Thus, in some embodiments, even in systems without a keyboard, a graphical user interface 68 may be generated prior to booting of the system and this interface 68 may receive user inputs, for example to authenticate the user and to enable booting to occur. This may result in a more secure system than a system in which booting precedes user authentication. In other embodiments, machine settings or other identifiers may be advantageously received in the pre-boot stage before the available user input devices are operable. In some embodiments no operative hard disk or floppy drive is needed to start to use the system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: receiving a password through a graphical user interface generated by a graphics controller associated with a first processor before an operating system associated with a second processor, not an integral part of the first processor, boots; after receiving said password, comparing said password to stored information using the graphics controller; and booting the operating system associated with a second processor after comparing said password to stored information using said graphics controller.

2. The method of claim 1 including generating said graphical user interface using said graphics controller.

3. The method of claim 2 including storing information for generating said graphical user interface on an option memory.

4. The method of claim 2 including using boot code running on a graphics controller to generate the graphical user interface.

5. The method of claim 2 wherein generating a graphical user interface includes generating a graphical user interface to enable the user to input said password.

6. The method of claim 5 wherein generating a graphical user interface includes generating an on-screen keyboard.

7. The method of claim 1 including receiving inputs from the user through the graphical user interface without a keyboard.

8. The method of claim 1 including authenticating a user and allowing the operating system to boot if the user has been authenticated.

9. The method of claim 8 including receiving a password entered without a keyboard using the graphical user interface.

10. A computer readable non-transitory medium storing instructions that enables a graphics controller associated with a first processor to: receive a password through a graphical user interface generated by the graphics controller before an operating system associated with a second processor boots; after receipt of said password, but before the operating system is booted, compare said password to stored information using the graphics controller; and turn over control to the second processor to boot the operating system.

11. The medium of claim 10 wherein said medium stores instructions that enable the controller to generate a graphical user interface.

12. The medium of claim 11 wherein said medium stores instructions that enable the controller to generate said graphical user interface on an option memory.

13. The medium of claim 10 wherein said medium stores instructions that enable the controller to use the boot code running on a graphics controller to generate the graphical user interface.

14. The medium of claim 10 wherein said medium stores instructions that enable the controller to generate a graphical user interface to enable the user to input a password.

15. The medium of claim 14 wherein said medium stores instructions that enable the controller to generate an on-screen keyboard.

16. The medium of claim 10 wherein said medium stores instructions that enable the controller to receive inputs from the user through the graphical user interface without a keyboard.

17. The medium of claim 10 wherein said medium stores instructions that enable the controller to authenticate a user and allow the operating system to boot if the user has been authenticated.

18. The medium of claim 17 wherein said medium stores instructions that enable the controller to receive a password entered without a keyboard using the graphical user interface.

* * * * *